United States Patent [19]

Schminke

[11] Patent Number: 4,594,634
[45] Date of Patent: Jun. 10, 1986

[54] HIGH-VOLTAGE DIRECT-CURRENT SUPPLY WITH OVER-CURRENT PROTECTION

[75] Inventor: Wolfram Schminke, Laufenburg, Fed. Rep. of Germany

[73] Assignee: BBC Brown, Boveri & Company, Ltd., Baden, Switzerland

[21] Appl. No.: 633,926

[22] Filed: Jul. 24, 1984

[30] Foreign Application Priority Data

Sep. 8, 1983 [CH] Switzerland .................. 4902/83

[51] Int. Cl.⁴ ............................................. H02H 3/08
[52] U.S. Cl. ....................................... 361/93; 361/100
[58] Field of Search .................. 361/93, 98, 100, 101; 307/54, 63, 77, 81; 323/270, 277, 906; 363/68

[56] References Cited

U.S. PATENT DOCUMENTS 3,558,991 1/1971 Brandt, Jr. et al. ............... 361/93 X
4,238,820 12/1980 Naaijer ........................... 323/906 X
4,454,557 6/1984 Hurley ................................. 361/93

FOREIGN PATENT DOCUMENTS 1722 5/1979 European Pat. Off. .............. 307/77
653839 3/1929 France ................................ 363/68
2449811 7/1979 U.S.S.R. .

*Primary Examiner*—A. D. Pellinen
*Assistant Examiner*—H. L. Williams
*Attorney, Agent, or Firm*—Oblon, Fisher, Spivak, McClelland & Maier

[57] ABSTRACT

A high-voltage direct-current supply system which includes over-current protection and in which the load current supplied by a high-voltage source is measured in a current-measuring device. The high-voltage source includes a plurality of series-connected medium-high voltage sources each of which can be individually turned on and off and each of which includes at least one switching element. The switching elements are switched to interrupt the load current through the respective medium-high voltage source in the event that the load current exceeds a predetermined limit, as detected by a load current limit detector. By providing plural medium-high voltage sources with associated switching devices to derive a composite output voltage from the sum of the outputs of the individual medium-high voltage sources, an economic, flexible and functionally reliable supply unit is produced which has a high efficiency and long service life.

8 Claims, 8 Drawing Figures

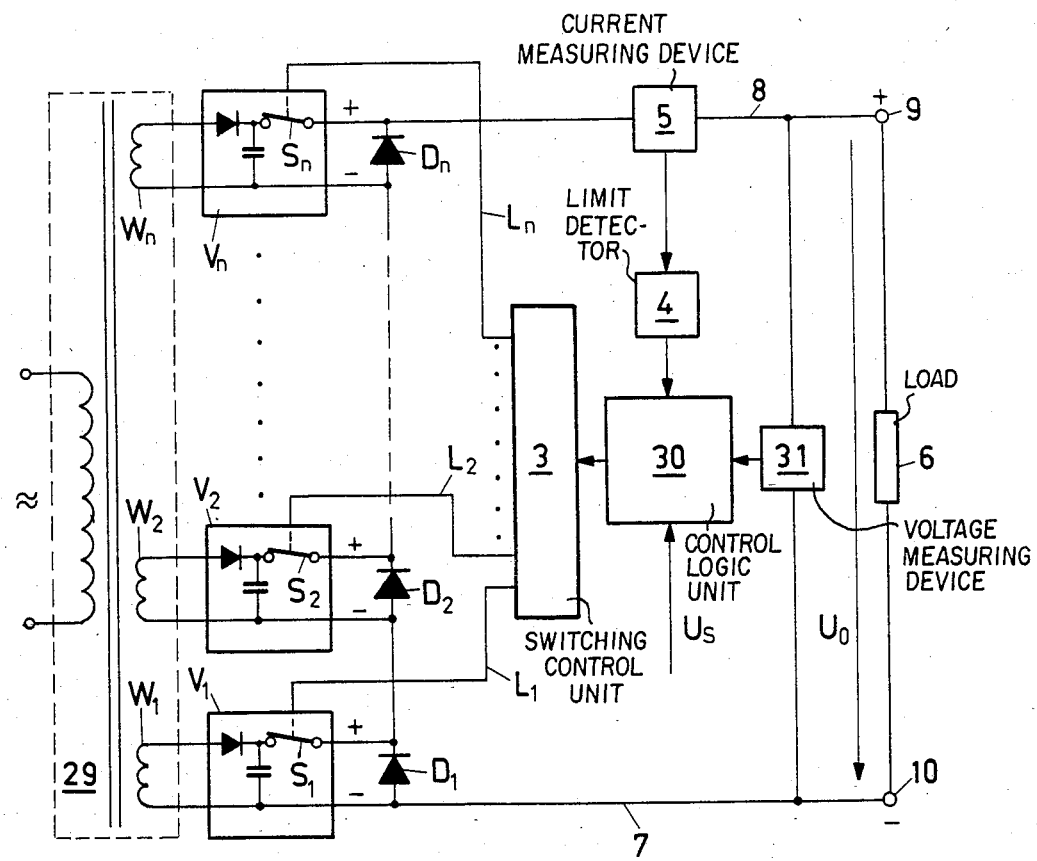
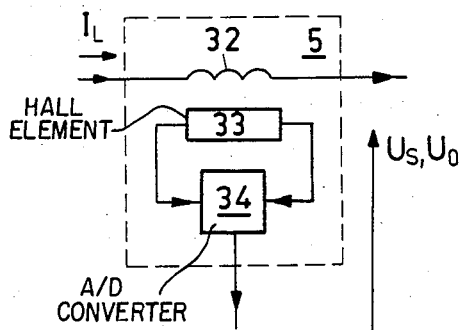
FIG.7
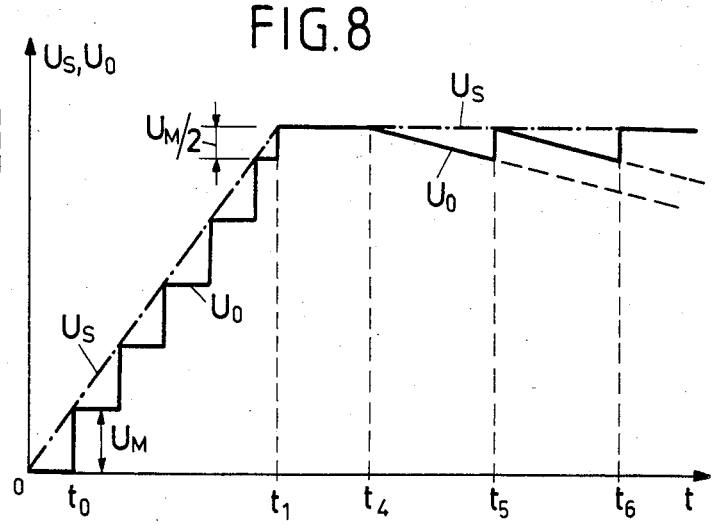
FIG.8

HIGH-VOLTAGE DIRECT-CURRENT SUPPLY WITH OVER-CURRENT PROTECTION

BACKGROUND OF THE INVENTION

1. Field of the Invention

This invention relates to a high-voltage direct-current supply system with over-current protection, including a high-voltage source having an output voltage, a current-measuring device for measuring a load current which flows through a load connected to the high-voltage source, a switching device for rapidly switching the load current, and a limit detector which is connected to the current-measuring device and drives the switching device when a predetermined limit of the load current is exceeded, via a switch control unit in such a manner that the load current is interrupted.

Such a supply system, as above briefly described on which high demands are made with regard to capacity and especially short-circuit safety, is known, for example, from the field of fusion research (P. L. Mondino and K. I. Selin in: Proc. of the 7th Symposium on Engineering Problems of Fusion Research, Knoxville, U.S.A., Oct. 25–28, 1977, p. 1558–1583), where it is provided as a supply unit for the additional heating of the plasma in a fusion reactor.

Depending on the method of plasma heating used, direct voltages within the range of 30–200 kV are needed at currents within the order of magnitude of 50 A. If the heating is carried out in particular by injecting a beam of neutral particles, short-circuits can repeatedly occur in the requisite injector system needed during the start-up phase and also during the beam injection proper, lasting several seconds, as a result of flashovers in the electrode system of the beam gun. In order to prevent damage to the sensitive injector system by such short-circuits, there is needed a rapidly responding over-current protection which reliably interrupts the current flow within less than 10 μs and switches the high voltage on again after a recovery time of 1–10 ms.

According to the aforementioned prior art, the high-voltage source is connected, for this purpose, via the series-connected switching device to the load, that is to say the injector system. The load current flows through the closed switching device and the current-measuring device arranged in an output line where its intensity is continuously measured during operation. But as soon as the load current exceeds a predetermined limit, the connected limit detector supplies a control signal to the switch control system which, in turn, opens the switching device and thus interrupts the flow of the load current.

Since the switching device is arranged in the output line of the supply system, it must not only be able to switch the load currents occurring but, above all, it must have an extraordinarily high electric strength so that the breaking process is not endangered. For the reasons mentioned, in the prior art a high-power tetrode is used as the switching device. The tetrode carries the load current as anode current when in the conducting state and in the short-circuit case breaks the load current by means of suitable control voltages being applied to its control grids.

However, the use of a high-power tetrode as a switching device between the high-voltage source and the load presents various problems. As a result of the cathode heater needed for operation and the high voltage drop of some kV between cathode and anode when in the conducting state, the tetrode has an internal power consumption of several 100 kW, which not only degrades the efficiency of the supply but must also be dissipated by appropriate cooling measures.

Similarly, with the currents and voltages occurring during switching operation, the electrodes of the tube are subjected to considerable stresses which can lead to a deformation of the internal tetrode structure and thus to a failure of the switching device.

Finally, in the case of a short-circuit, the breaking process is carried out by only one switching element, the tetrode, so that for the case of a malfunction of this tetrode a crowbar circuit connected in parallel with the source and requiring additional expenditure on components and control circuits must also be provided between the switching device and the high-voltage source.

SUMMARY OF THE INVENTION

Accordingly, the objects of this invention are to provide a novel high-voltage direct-current supply system with an over-current protection which, apart from a considerably improved efficiency, has increased operational reliability and can also be constructed more cost-effectively.

These and other objects are achieved according to the invention by providing a novel high-voltage direct-current supply of the type initially mentioned, wherein the high-voltage source includes a plurality of medium-high voltage sources which each supply a medium-high voltage at their output terminals. The output terminals of the medium-high voltage sources are connected in series such that the sum of the medium-high voltages form the output voltage. Each of the medium-high voltage sources contains at least one switching element for rapidly switching off the associated medium-high voltage source, and the output terminals of each medium-high voltage source are connected by a reverse-biased no-load diode. Thus, the switching elements form the switching device and can be simultaneously driven by the switch control unit via control lines.

According to the invention, both the high-voltage source and the switching device are constructed from a plurality of medium-high voltage sources and less-stressed switching elements. Thus each of the switching elements needs to be designed only to switch the medium-high voltage of the medium-high voltage source associated with it. In this manner, the problems of voltage division occurring when a single switch is replaced by a plurality of series-connected switching elements are avoided.

Dividing the high-voltage source into a plurality of medium-high voltage sources in accordance with the invention, each of which sources contains at least one switching element for the rapid switching off of the respective medium-high voltage source, makes it possible to use, instead of the sensitive, expensive high-power electrode with limited life, a plurality of inexpensive switching elements which are also less susceptible to interference. Further, the power consumption of the sum of which elements is clearly below that of the tetrode and thus leads to a clearly improved efficiency of the supply system.

A further advantage lies in the gain in reliability resulting from this division because the operational capability of the total system is not significantly affected by the failure of one or several medium-high voltage sources and switching elements.

A particularly inexpensive construction of the supply unit is possible if, according to a preferred embodiment of the invention, all medium-high voltage sources supply the same medium-high voltage because then, on the one hand, the advantages of series production can be exploited during manufacture and, on the other hand, the modular construction makes it possible to adapt the supply system easily to different power requirements.

According to an illustrative embodiment of the invention, semi-conductor switches are provided as switching elements in the medium-high voltage sources which switches, apart from a practically unlimited life, also have a very low forward voltage of only a few volts. Preferably, breaking thyristors known as GTO (gate turn-off) thyristors are used which have the general advantages of a semi-conductor switch combined with high load-carrying capacity.

In a further development of the concept of the invention, the medium-high voltage sources which can be individually switched on and off, are also used in conjunction with a control logic system for controlling or regulating the output voltage. Compared with the series-regulation method, known from the prior art, by means of the high-power tetrode which results in dissipated power going up into the MW range, efficiency of up to 95% is achieved by the deliberate switching on and off of individual medium-high voltage sources.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a schematic circuit diagram of a high-voltage direct-current supply according to the invention with additional control and regulation of the output voltage, FIG. 7 is a schematic circuit diagram of an illustrative embodiment for the current-measuring device according to FIG. 4, and FIG. 8 is a graph showing the variation with time of the regulated output voltage of a supply system according to FIG. 6.

DESCRIPTION OF THE PREFERRED EMBODIMENTS

Figure 1:
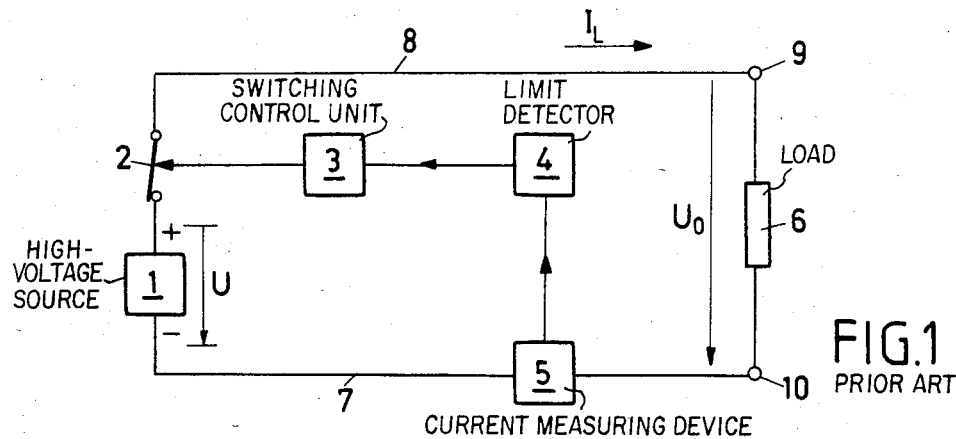
FIG. 1 is a schematic circuit diagram of a known high-voltage direct-current supply system with over-current protection.

Referring now to the drawings, wherein like reference numerals designate identical or corresponding parts throughout the several views, FIG. 1 shows the principle of a known high-voltage direct-current supply system, hereinafter briefly called HV-DC supply system, as used, for example, in fusion research. A high-voltage source 1 with a source voltage U and an output voltage $U_o$ is connected via a switching device 2 and two output lines 7 and 8 to two output terminals 9 and 10 across which a load 6, for example an injection system for plasma heating, is connected.

In the one output line 7, a current-measuring device 5, in most cases a sensing resistor, is arranged at the output of which a measurement signal proportional to the load current $J_L$ flowing through the load 6 appears. The measurement signal passes from the current-measuring device to a limit detector 4 in which a predetermined limit of the load current $J_L$ is stored. As soon as this limit is exceeded because, for example, a short-circuit is present in the load 6, the limit detector supplies a signal to a subsequent switching control unit 3 which opens the switching device 2 connected and thus breaks the load current $J_L$.

Figure 2:
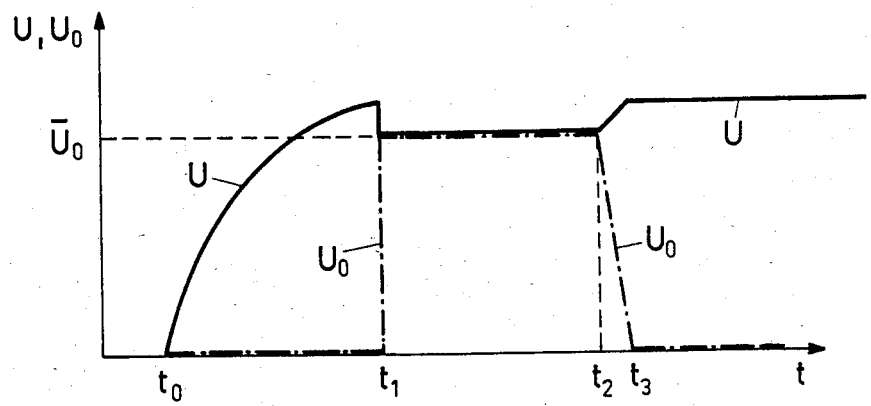
FIG. 2 is a graph showing the characteristic variation with time of the voltages of a high-voltage direct-current supply system according to FIG. 1 when operating a neutral beam injector.

The variation with time of the output voltage $U_o$ and of the source voltage U of the high-voltage source 1 for such an operating cycle is reproduced in a joint diagram in FIG. 2. At time $t_o$ and with an open switching device 2, the source voltage U is first increased by a controlled static converter, not drawn in FIG. 1, from zero slowly to a nominal value which is reached at time $t_1$. In this phase, the output voltage $U_o$ is equal to zero. At $t_1$, the switching device 2 is then closed which applies the load 6 to the high-voltage source 1. The output voltage $U_o$ jumps to the value of the steady output voltage $U_o$ which is equal to the source voltage U lowered by the loading. During the subsequent injection period, the output voltage $U_o$ remains constant until a short-circuit occurs at time $t_2$ and the limit detector 4 responds. The switching device 2 opens and the output voltage $U_o$ drops to zero within less than 10 μs to $t_3$ whereas the source voltage U rises to its original no-load value.

Figure 3:
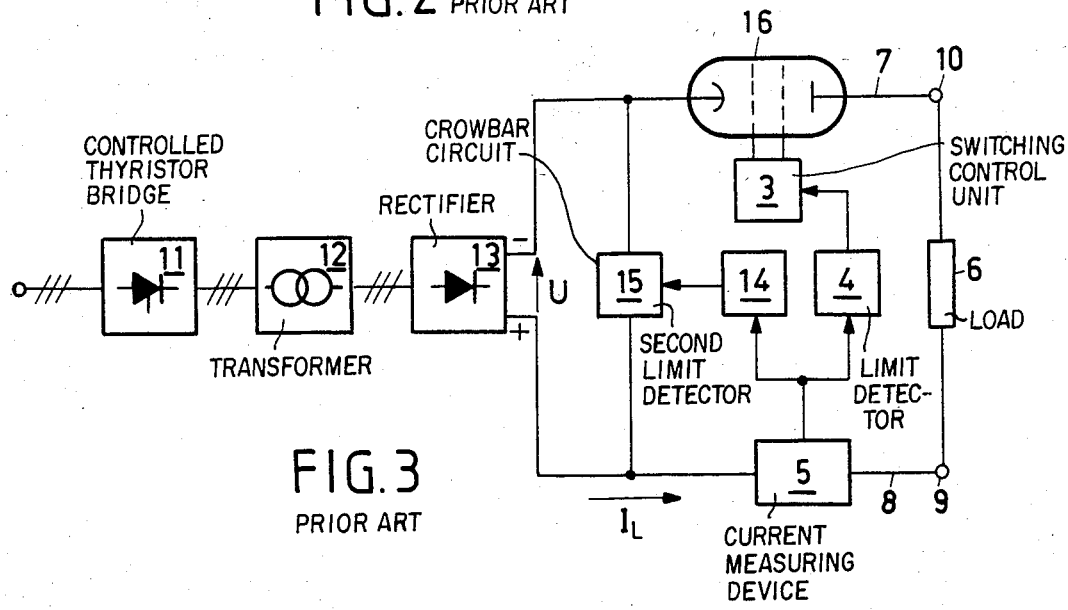
FIG. 3 is a schematic block diagram of the known embodiment of a supply system according to FIG. 1 with a high-power tetrode.

Further details of the known HV-DC supply system are shown in FIG. 3. From a three-phase system, alternating voltage passes via a controlled thyristor bridge 11, which is used to set the source voltage U, via a transformer 12 to a retifier 13 including a filter, not shown. At the output of the rectifier 13, the source voltage U is available. The switching device used is a high-power tetrode 16, the control grid of which is driven by the limit detector 4 via the switch control unit 3. In order to increase reliability in the case of a short-circuit, a crowbar circuit 15 is inserted in front of the high-power tetrode 16 and is fired via a second limit detector 14, having a higher limit, if the high-power tetrode 16 is not capable of breaking the load current $J_L$ when the first limit in the limit detector 4 is exceeded.

Figure 4:
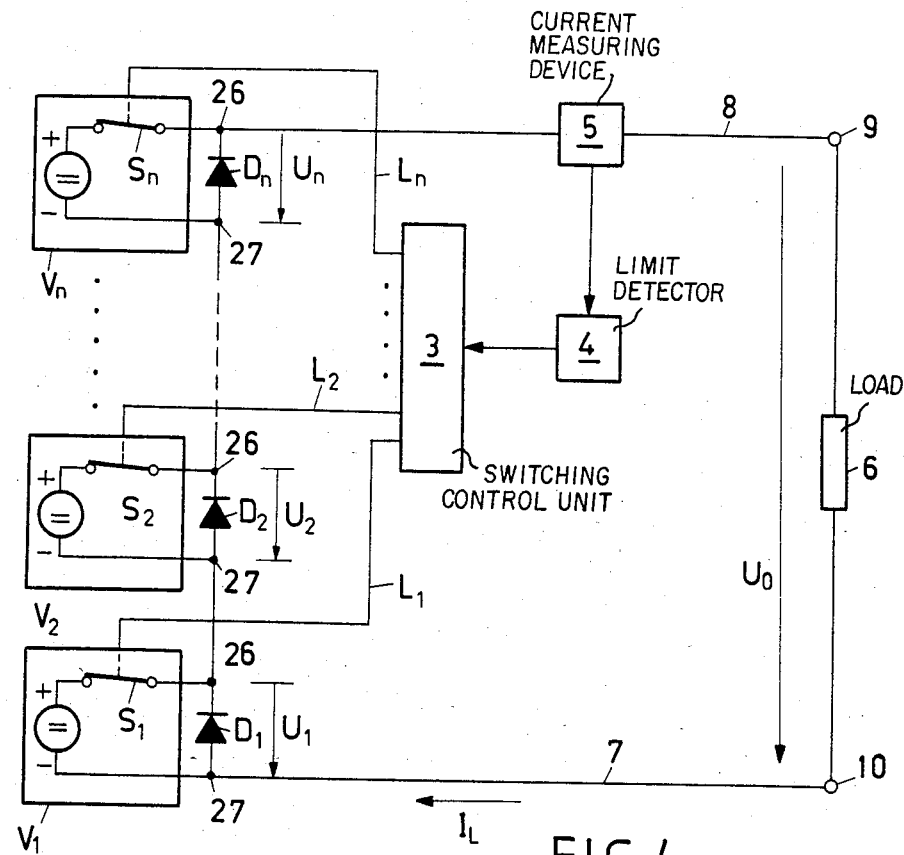
FIG. 4 is a schematic circuit diagram of a high-voltage direct-current supply according to the invention.

In contrast, FIG. 4 shows the basic circuit diagram of the HV-DC supply system according to the invention. The high-voltage source consists here of a plurality of medium-high voltage sources $V_1 \ldots V_n$ at the outputs of which corresponding medium-high voltages $U_1 \ldots U_n$ appear. In the text which follows, "medium-high voltage" means voltages ofsome 100 V up to some kV. The outputs of the medium-high voltage sources $V_1 \ldots V_n$ are connected in series so that the resultant output voltage $U_o$ is the sum of all medium-high voltages $U_1 \ldots U_n$ ($U_o = U_1 + \ldots + U_n$), if all medium-high voltage sources $V_1 \ldots V_n$ are switched on.

Each of the medium-high voltage sources $V_1 \ldots V_n$ contains at least one switching element $S_1 \ldots S_n$ which in each case is arranged inside its source in such a manner that when the switching element $S_1 \ldots S_n$ is opened, no current can flow from the associated medium-high voltage source $V_1 \ldots V_n$. The output terminals 26 and 27 of each medium-high voltage source $V_1 \ldots V_n$ are connected by a reverse-biased no-load diode $D_1 \ldots D_n$. The arrangement of the no-load diodes $D_1 \ldots D_n$ ensures that, if a part of the medium-high voltage sources $V_1 \ldots V_n$ is switched off, the load current $J_L$ can continue to flow without impediment via the no-load diodes of the disconnected sources, with a correspondingly reduced output voltage $U_o$, and the voltage applied to the open switching elements is not significantly greater than the medium-high voltage of the associated medium-high voltage source. Thus, if for example the switching element $S_1$ of the medium-high voltage source $V_1$ is opened whilst the remaining switching elements $S_2 \ldots S_n$ of the remaining medium-high voltage sources $V_2 \ldots V_n$ are closed, the output voltage $U_o$ is reduced by the medium-high voltage $U_1$. The correspondingly reduced load current $J_L$ then flows via the no-load diode $D_1$. The other no-load diodes $D_2 \ldots D_n$, in contrast, are reverse biased by the medium-high voltages $U_2 \ldots U_n$ applied so that the load current $J_L$ is not passed via these no-load diodes but via the associated medium-high voltage sources $V_2 \ldots V_n$. Since the no-load diode $D_1$ is forward biased, only a potential difference of the order of magnitude of the forward voltage of the no-load diode $D_1$ exists between the connecting terminals 26 and 27 of the medium-high voltage source $V_1$ and this can be neglected in comparison with the medium-high voltage $U_1$. For this reason, only the voltage which is supplied as source voltage by the medium-high voltage source $V_1$ and is essentially equal to the medium-high voltage $U_1$ is dropped across the open switching element $S_1$.

Without the no-load diodes $D_1 \ldots D_n$ located in the output, however, the load current $J_L$ as a whole would be interrupted with the opening of the one switching element $S_1$. This would load the open switching element $S_1$ with the full output voltage $U_o$ which would thus have to have the same design tolerances as the high-power tetrode of the prior art. The no-load diodes $D_1 \ldots D_n$ therefore, play a significant role in the dividing of the switching load to the individual switching elements $S_1 \ldots S_n$ and make it possible for the individual medium-high voltage sources $V_1 \ldots V_n$ to be independently switched on and off.

The switching elements $S_1 \ldots S_n$ are connected via control lines $L_1 \ldots L_n$ which, because of potential isolation between power section and control section, are advantageously constructed as optical wave guides, to the switching control unit 3 which converts a breaking instruction supplied by the limit detector 4 into corresponding control instructions for the individual switching elements $S_1 \ldots S_n$. In this arrangement, the control instructions are all applied in a time interval which is smaller than or equal to the breaking time demanded, that is to say, for example, 10 μs. In special cases in which it is desirable for the load current $J_L$ to have a specified decay characteristic, however, the control instructions can also be supplied to the displaced in time in such a manner that the load current $J_L$ decreases in corresponding steps.

It is particularly advantageous if the medium-high voltage sources $V_1 \ldots V_n$ are constructed to be identical in their internal configuration and with respect to the medium-high voltage $U_1 \ldots U_n$ supplied. Each of the medium-high voltage sources $V_1 \ldots V_n$ then contributes the same medium-high voltage $U_m$ to the output voltage $U_o$ so that $U_o = n \cdot U_m$ applies for a number of n medium-high voltage sources. The medium-high voltage sources, of which about 100 are required for an HV-DC supply system with a $U_m = 1$ kV and $U_o = 100$ kV, can then be manufactured in larger series which leads to a noticeable reduction in manufacturing costs. In addition, by adding or omitting individual or several medium-high voltage sources, different requirements on the magnitude of the output voltage $U_o$ can be met in a simple manner with this modular configuration.

Figure 5:
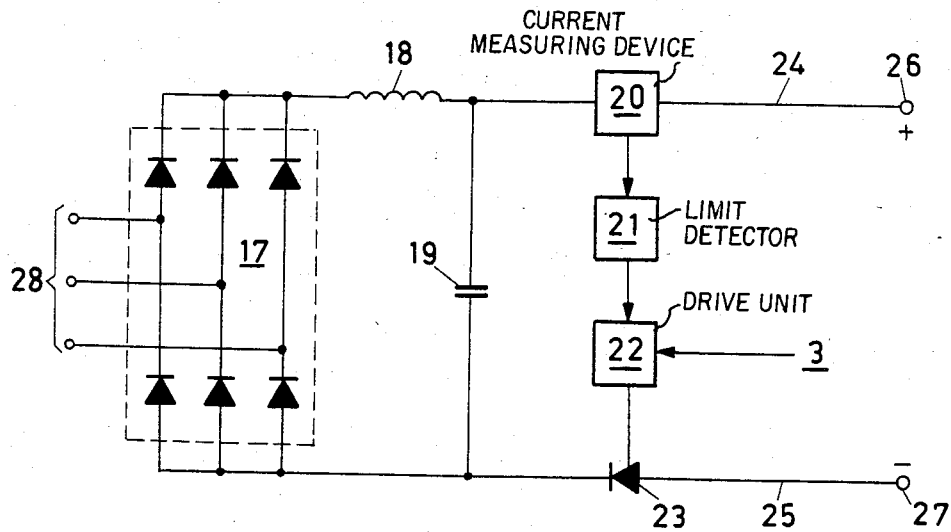
FIG. 5 is a schematic circuit diagram of an illustrative embodiment of a medium-high voltage source from FIG. 4.

A preferred illustrative embodiment for a medium-high voltage source $V_1 \ldots V_n$ is shown in FIG. 5. An alternating voltage rectified by means of a rectifier bridge 17 is applied to a three-phase alternating-voltage input 28 which is connected, for example, to the secondary winding of a system transformer, not drawn. The remaining alternating-voltage component is filtered out in known manner by a series-connected choke 18 and a parallel filter capacitor 19. The smoothed direct voltage is fed by two output lines 24 and 25 to corresponding output terminals 26 and 27. In the one output line, a forward-biased gate turn-off thyristor 23, the gate of which is connected to a drive unit 22, is arranged as a switching element.

The drive unit 22 generates the control pulses, required for the switching operation of the gate turn-off thyristor 23, as soon as an appropriate control instruction appears at its input. In a first embodiment shown in FIG. 4, this control instruction is supplied by the central switch control unit 3, the load current $J_L$ is monitored centrally by the current-measuring device 5 which is connected to the limit detector 4. This central monitoring has a particularly simple configuration but allows pre-setting of only a single limit which does not take account of the individual requirements of the individual medium-high voltage sources $V_1 \ldots V_n$.

In a second embodiment shown in FIG. 5, therefore, in each medium-high voltage source a monitoring device is provided for each individual source and consists of a current-measuring device 20, inserted into an output line 24, and a further limit detector 21. The output of the limit detector 21 is also connected to the input of the driving unit 22 so that the gate turn-off thyristor 23 is always switched off when a breaking instruction arrives from either the central switch control unit 3 or from the decentralized limit detector 21.

Since, as mentioned before, in an arrangement according to FIG. 4 the load current $J_L$ flows through each of the medium-high voltage sources $V_1 \ldots V_n$ the switching element of which is closed, the same current is measured in the normal case in the current-measuring devices 5 and 20. For this reason, the combination of the central monitoring unit and a decentralized current monitoring in the individual source represents a dual safeguard. In addition, however, the decentralized monitoring also detects short-circuits occurring in the HV-DC supply system in front of the current-measuring device 5.

On the other hand, centralized monitoring by means of the current-measuring device 5 can also be totally omitted for the reasons mentioned. In this case, the over-current protection is integrated into each of the medium-high voltage sources $V_1 \ldots V_n$ but in this arrangement attention must be paid to having a close tolerance in the breaking characteristic of the various sources in order to achieve as short a breaking time as possible for the HV-DC supply system overall.

Determination of the medium-high voltage $U_1 \ldots U_n$ and $U_M$ essentially depends on the tolerances of the switching elements available at the time. In the case of the preferred use of gate turn-off (GTO) thyristors, medium-high voltages of some kV can be switched with single thyristors at currents of several 100 A. In order to avoid several gate turn-off thyristors being connected in series, and the associated problems of voltage distribution, it is advantageous, therefore, to select medium-high voltages of less than 10 KV. In a proven embodiment of a medium-high voltage source, the medium-high voltage is about 1 kV at a maximum current of approximately 100 A.

Apart from the pure over-current protection, according to a further development of the concept of the invention, the arrangement of the medium-high voltage sources $V_1 \ldots V_n$ according to FIG. 4 can also be used for controlling and regulating the output voltage $U_o$. Since the medium-high voltage sources $V_1 \ldots V_n$ are designed to be switched on and off individually, various voltage steps in the output voltage $U_o$ can be realized by combining various medium-high voltages if suitable drive is applied. If, for example, all medium-high voltage sources $V_1 \ldots V_n$ supply the same medium-high voltage $U_M$, stepped output voltages $U_o$ from $U_M$ to $n-U_M$ can be generated by switching in individual sources in steps. The deviation of the actual output voltage $U_o$ from a pre-determined nominal voltage $U_S$ can in this case be limited to a maximum value of $U_{M/2}$. This maximum deviation can be further reduced if only the majority of the medium-high voltage sources $V_1 \ldots V_n$ supplies the same medium-high voltage $U_M$ and the medium-high voltages of the remaining medium-high voltage sources are graduated to form the $2^m$th part of $U_M$ where $m=1, 2, \ldots$. If thus, for example, two medium-high voltage sources with the medium-high voltages $U_{M/2}$ and $U_{M/4}$ are provided, apart from the voltage steps between $l \cdot U_M$ and $(l+1) U_M$, the steps $(l+\frac{1}{4}) U_M$, $(l+\frac{1}{2}) U_M$, $(l+\frac{3}{4}) U_M$ can also be set, $l$ being a whole number, so that the maximum deviation between output voltage $U_o$ and nominal voltage $U_S$ is reduced to $U_{M/8}$.

FIG. 6 shows the basic circuit diagram of an HV-DC supply system with additional control and regulation of the output voltage $U_o$. The input of the medium-high voltage sources $V_1 \ldots V_n$, the rectifier and filter functions of which are symbolized by a diode and a capacitor, are connected to separate secondary windings $W_1 \ldots W_n$ of a system transformer 29. For reasons of clarity, the system transformer 29 is shown as a single-phase transformer but is usually used as a three-phase type for connection of medium-high voltage sources according to FIG. 5. To the function blocks, known already from FIG. 4, of the current-measuring device 5, the limit detector 4 and the switch control unit 3, a control logic unit 30 is here added which, on the one hand, processes the turn-off instruction from the limit detector 4 and, on the other hand, an input variable which corresponds to a nominal voltage $U_S$, pre-determined from outside.

The control logic unit 30 divides the value of the nominal voltage $U_S$ by the value of the medium-high voltage $U_M$ and thus determines the number of medium-high voltage sources $V_1 \ldots V_n$ which must be switched on in order to approximate the nominal voltage $U_S$ as accurately as possible with the output voltage $U_o$. If, in addition, medium-high voltage sources with binary graduated medium-high voltages $U_{M/2^m}$ are present, the control logic unit 30 also turns on a part of the binary-graduated sources, as determined by the remainder of the division, which in the appropriate combination further reduce the deviation between nominal voltage $U_S$ and output voltage $U_o$. The result from the control logic unit 30 is passed in binary form to the switch control unit 3 from which the appropriate control instructions are fed via the control lines $L_1 \ldots L_n$ to the switching elements $S_1 \ldots S_n$.

Within the control logic unit 30, the function of the over-current protection has a higher priority than the control function in dependence on the nominal voltage $U_S$. A turn-off instruction from the limit detector 4 interrupts the process of controlling and is passed as a turn-off instruction for all medium-high voltage sources $V_1 \ldots V_n$ to the switch control unit 3. In order to switch the output voltage $U_o$ on again automatically after such emergency breaking, after a pre-determined recovery time has elapsed, a timer can be provided within the control logic unit 30 which timer initiates the reconnection of the medium-high voltage sources $V_1 \ldots V_n$ as determined by the nominal voltage $U_S$ after the recovery time has elapsed.

In addition to pure controlling in dependence on the nominal voltage $U_S$, in a further preferred embodiment according to FIG. 6 a system of regulating the output voltage $U_o$ is also implemented. For this purpose, a voltage-measuring device 31 is connected in parallel with the output terminals 9 and 10 of the HV-DC supply system with which device the actual magnitude of the output voltage $U_o$ is continuously measured. The result of each measurement is fed to another input of the control logic unit 30. The control logic unit 30 compares $U_o$ and $U_S$ and forms the difference between the two magnitudes. From the amount and the sign of this difference it determines, again by a division of the type already described, which and how many medium-high voltage sources must be switched on or off in order to minimize the deviations between $U_o$ and $U_S$.

The control logic unit 30 is preferably formed by one or several micro-processors which carry out the computing steps necessary for control and regulation and carry out a suitable selection of the medium-high voltage sources $V_1 \ldots V_n$. In this case, a separate limit detector 4 can also be omitted if the measurement values for the load current $J_L$ from the current-measuring device 5 are supplied in digital form to the control logic unit 30 and are there compared with the digitized and stored limit value of the load current $J_L$.

For a direct connection between current-measuring device 5 and control logic unit 30, potential isolation is necessary which is preferably carried out inside the current-measuring device 5 according to FIG. 7. The load current $J_L$ flows through a field coil 32 which, in the extreme case, can consist of a straight piece of conductor. The magnetic field generated by the field coil 32 acts on a Hall element 33 which is supplied with a constant direct current by a supply unit, not drawn. The Hall voltage, which is a function of the magnetic field, is supplied to an A/D converter 34 which generates from the Hall voltage a digital signal which is proportional to the load current $J_L$ and passes this signal on to the control logic unit 30 for comparison with the pre-determined limit value. In the same manner, potential isolation can also be carried out inside the voltage-measuring device 31 if the voltage to be measured is first converted into a corresponding current with the aid of a high-precision resistance.

The variation with time of the controlling and regulating process is shown as a $U_o(t)$ curve in FIG. 8. The dot-dashed line of the curve of the nominal voltage $U_S$ marks the voltage variation which should be ideally followed by the output voltage $U_o$. The linear rise of $U_S$ between time $t=0$ and time $t_1$ is simulated by the output voltage $U_o$ by successively adding medium-high voltage sources in steps $U_M$. Since $U_S$ changes at time $t_1$ into a horizontal line which is above the last-assumed step of $U_o$ by only about $U_{M/2}$, a medium-high voltage source with the full medium-high voltage $U_M$ is no longer added at $t_1$, but one of the binary-graduated sources having a medium-high voltage of $U_{M/2}$.

At time $t_4$, a load fluctuation begins which becomes noticeable by a reduction in load impedance and a drop in the output voltage $U_o$. At time $t_5$, $U_o$ has already fallen to such an extent that the control logic effects a change in control in order to equalized the difference between $U_S$ and $U_o$. The medium-high voltage source with $U_{M/2}$ is turned off and, in turn, another medium-high voltage source with $U_M$ is turned on. The resultant increase of $U_o$ by $U_{M/2}$ is just sufficient to equalized the difference $U_S - U_o$. If the output voltage $U_o$ continues to drop, the control logic unit turns the source with the medium-high voltage $U_{M/2}$ on again at time $t_6$ so that $U_o$ is again matched to $U_S$. The regulation according to FIG. 8 is subject to large fluctuations because in this illustration, the existence of only one medium-high voltage step with a binary-graduated voltage $U_{M/2}$ has been used as a basis for reasons of clarity. A correspondingly smooth control and regulating process results if a plurality of medium-high voltage sources with binary-graduated voltage steps $U_{M/2}$, $U_{M/4}$, $U_{M/8}$, $U_{M/16}$ ... exist within the HV-DC supply system.

Overall, an HV-DC supply system according to the invention represents a supply unit which is particularly economic to produce and operate, is functionally reliable, flexible and easily controlled and regulated and which, in comparison to the prior art, has a greatly improved efficiency with a simultaneously increased service life.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high-voltage direct-current supply system with over-current protection, comprising:
   a high-voltage source having an output voltage and comprising a plurality of medium-high voltage sources each having output terminals at which is supplied a medium-high voltage, the output terminals of the medium-high sources connected in series so as to sum the medium-high voltages to form the output voltage based on the sum, each of the medium-high voltage sources including at least one thyristor switching element for rapidly switching off the associated medium-high voltage source, and
   a reverse-biased no-load diode connecting the output terminals of each medium-high voltage source;
   a current-measuring device for measuring a load current which flows through a load connected to the high-voltage source;
   a limit detector for detecting when a predetermined limit of load current is exceeded;
   a switch control unit connected to said limit detector and to said switching elements via respective control lines for simultaneously applying control signals to said switching elements via said control lines such that at least one of said switching elements interrupts load current through the respective medium-high voltage source when said predetermined limit is exceeded;
   wherein plural of the medium-high voltage sources each supply the same medium-high voltage and the remaining medium-high voltage sources supply a respective output voltage equal to the $2^m$ the part of said medium-high voltage, where $m=1, 2, \ldots$;
   each medium-high voltage source comprising a current-measuring device and a limit detector such that the respective medium-high voltage source is turned off also if the current supplied by said respective medium-high voltage source exceeds a predetermined limit.

2. A high-voltage direct-current supply system according to claim 1, wherein said medium-high voltage is less than 10 kV.

3. A high-voltage direct-current supply system according to claim 2, wherein said medium-high voltage is approximately 1 kV.

4. A high-voltage direct-current supply system according to claim 1, wherein said thyristor switching element comprises a gate turn-off thyristor.

5. A high-voltage direct-current supply system according to claim 1, wherein each medium-high voltage source comprises:
   a rectifier bridge coupled to a filter comprising a choke and a filter capacitor connected via separate secondary windings of a system transformer to an alternating-voltage system.

6. A high-voltage direct-current supply system according to claim 1, wherein the current-measuring device comprises:
   a field coil through which the load current flows to produce a magnetic field, and
   a Hall element for sensing said magnetic field and for producing a corresponding output signal which is converted in a subsequent A/D converter into a digital value corresponding to the current and is passed on to the limit detector.

7. A high-voltage direct-current supply system according to claim 1, wherein said control lines comprise optical waveguides for the thyristor switching elements.

8. A high-voltage direct-current supply source according to claim 6, wherein said control lines comprise optical waveguides for the thyristor switching elements.

* * * * *